Patented Dec. 23, 1930

1,785,888

UNITED STATES PATENT OFFICE

GEORGE C. COX, OF RALEIGH, AND HENRY K. McINTYRE, DECEASED, LATE OF RALEIGH, NORTH CAROLINA, BY EDNA MOORE McINTYRE, EXECUTRIX, OF RALEIGH, NORTH CAROLINA, AND JOHN GARDINER McINTYRE, OF NEW YORK, N. Y., AND MALCOLM McINTYRE, OF CRANFORD, NEW JERSEY, EXECUTORS

GLASS PURIFICATION

No Drawing. Application filed October 5, 1926, Serial No. 139,751. Renewed May 8, 1930.

This invention relates to glass making and has particular relation to the removal of impurities from glass.

Various impurities occur in the sand or quartz used for making glass. These impurities are principally the oxides of the heavy metals. In the making of white or colorless glass it is desirable and sometimes necessary to have present as little of these impurities as possible. Of all the impurities, the one most desirable to eliminate, for certain purposes, is iron in any form. For some purposes, the presence of a fraction of one percent of iron oxide renders the glass unfit for use.

The primary purpose of this invention is the provision of a process for removing impurities from glass stock.

Another object of the invention is to provide a process wherein the stock may be kept molten when desired during the operation, even though the fusion point rises as the impurities are removed.

The process comprises broadly the supplying of heat energy to the electrolyte by generating heat within the electrolyte, it being found impractical to supply sufficient heat through refractory material to the electrolyte because of the necessity to maintain high temperatures to carry the process to a conclusion, direct current being passed through the electrolyte to bring about the electrolytic action and the reduction of the undesired metal from its compound or compounds.

While other ways of supplying heat, to the electrolyte, may suggest themselves to one skilled in the art, it is proposed to supply this heat by means of electric current. This current may be alternating current to supply heat energy to the electrolyte by means of electrodes within the electrolyte chamber, which electrodes may be in contact with or below the surface of the electrolyte or they may, during operation, be slightly above the surface of the electrolyte, to cause an arc to be formed therebetween. If preferred, the energy may be furnished by an induction winding which, with or without a core is so disposed as to generate heat within the electrolyte. If preferred, any two or more or all of the methods of heating the electrolyte may be used in the same furnace and under some conditions, it may be found to be desirable to use one or more forms during part of the operation and one or more of the same or others during another part of the operation for different conditions.

The direct current or electrolytic electrodes are preferably entirely independent of the alternating current electrodes or other heating means and are preferably arranged so the path of the direct current will be at a decided angle to the path of any conducted or induced heating current.

In operation, the electrolyte is maintained at sufficient temperature by the heating means and the direct current turned on to bring about electrolysis. The voltage of this direct current is maintained at such a point as will insure the reduction of the metal of the compound which it is desired to remove from the glass stock.

The metal reduced from its compound, which forms the impurity of the glass, will collect at the cathode while the other portion of the compound will collect adjacent the anode.

The position of the cathode and anode in the furnace and their relative positions to each other and to the heating current electrodes, if such are used, depends upon the impurity or impurities to be removed from the glass.

Various modifications and details will be evident to one skilled in the art and it is to be understood that the invention is not intended to be limited to details and that various changes and modifications may be made without departing from the spirit of the invention and within the scope of the appended claims.

Having described the invention what is claimed and desired to have secured by Letters Patent is:—

1. The process of purifying glass which comprises the maintaining of glass stock electrolyte at an optimum temperature by the generation of heat within the electrolyte, and the passing of direct current through the electrolyte, thereby depositing reduced metal at the cathode.

2. The process of purifying glass which comprises the maintaining of glass stock electrolyte at an optimum temperature by the use of alternating current, the alternating current generating heat within the electrolyte and the passing of direct current through the electrolyte, thereby depositing reduced metal at the cathode.

In testimony whereof we hereunto affix our signatures.

GEORGE C. COX.
EDNA MOORE McINTYRE,
*Joint Executrix of the Last Will and Testament of Henry K. McIntyre, Deceased.*
JOHN GARDINER McINTYRE,
*Joint Executor of the Last Will and Testament of Henry K. McIntyre, Deceased.*
MALCOLM McINTYRE,
*Joint Executor of the Last Will and Testament of Henry K. McIntyre, Deceased.*